(12) United States Patent
Putzer et al.

(10) Patent No.: US 11,504,961 B2
(45) Date of Patent: Nov. 22, 2022

(54) METHOD OF OPERATING A ROTARY PRINTING PRESS

(71) Applicant: HEIDELBERGER DRUCKMASCHINEN AG, Heidelberg (DE)

(72) Inventors: Marcus Putzer, Pleystein (DE); Hans Schadl, Hirschau (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 17/119,178

(22) Filed: Dec. 11, 2020

(65) Prior Publication Data

US 2021/0178747 A1 Jun. 17, 2021

(30) Foreign Application Priority Data

Dec. 17, 2019 (EP) .................................. 19217007

(51) Int. Cl.
| | | |
|---|---|---|
| *B41F 5/24* | (2006.01) | |
| *B41F 13/26* | (2006.01) | |
| *B41F 13/08* | (2006.01) | |
| *B41F 31/30* | (2006.01) | |

(52) U.S. Cl.
CPC ................ *B41F 5/24* (2013.01); *B41F 13/26* (2013.01); *B41F 13/085* (2013.01); *B41F 31/307* (2013.01); *B41P 2233/00* (2013.01)

(58) Field of Classification Search
CPC .......... B41F 5/24; B41F 13/26; B41F 13/085; B41F 33/0072; B41F 33/16; B41F 31/30; B41F 31/301; B41F 31/304; B41F 31/32; B41F 31/307; B41P 2233/00
See application file for complete search history.

(56) References Cited

U.S. PATENT DOCUMENTS

| | | | |
|---|---|---|---|
| 8,196,924 B2 | 6/2012 | Numauchi | |
| 8,763,529 B2 | 7/2014 | Buck et al. | |
| 9,623,649 B2 * | 4/2017 | Van Der Meulen | ...... B41F 3/54 |
| 9,895,873 B2 | 2/2018 | Chiari et al. | |
| 2011/0315036 A1 | 12/2011 | Bouma et al. | |
| 2019/0176463 A1 * | 6/2019 | Weissbacher | ........... B41F 33/00 |

FOREIGN PATENT DOCUMENTS

| | | | |
|---|---|---|---|
| CN | 101168321 A | 4/2008 | |
| CN | 101734008 A | 6/2010 | |
| CN | 103987524 A | 8/2014 | |
| CN | 107848293 A | 3/2018 | |
| DE | 10107135 A1 | 8/2002 | |
| DE | 102005012915 A1 | 9/2006 | |
| DE | 102009026494 A1 | 6/2010 | |
| EP | 1820643 A2 | 8/2007 | |
| EP | 2762314 A1 | 8/2014 | |
| WO | WO-2018036619 A1 * | 3/2018 | .............. B41F 33/16 |

* cited by examiner

*Primary Examiner* — Matthew G Marini
*Assistant Examiner* — Leo T Hinze
(74) *Attorney, Agent, or Firm* — Laurence A. Greenberg; Werner H. Stemer; Ralph E. Locher

(57) ABSTRACT

In a method for operating a rotary printing press, preferably a flexographic printing press that processes webs, disturbances of a rotating printing cylinder are detected and reduced by changing the printing speed. Here, the disturbances are detected at an actuating drive of the printing cylinder. This leads to a cost-efficient way of printing without disturbances.

8 Claims, 3 Drawing Sheets

METHOD OF OPERATING A ROTARY PRINTING PRESS

CROSS-REFERENCE TO RELATED APPLICATION

This application claims the priority, under 35 U.S.C. § 119, of European patent application EP 19217007, filed Dec. 17, 2019; the prior application is herewith incorporated by reference in its entirety.

BACKGROUND OF THE INVENTION

Field of the Invention

The present invention relates to a method for operating a rotary printing press in which disturbances of a rotating printing cylinder are detected and reduced by reducing the printing speed.

The technical field of the invention is the graphic industry, in particular the field of operating a rotary printing press, preferably a flexographic printing press. In particular, the invention lies in the subcategory of controlling the press or rather the drives thereof to avoid or reduce disturbances.

When rotary printing presses that process webs of material are operated, disturbances may affect the quality of the prints, for example disturbances in the form of so-called "bouncing" in flexographic printing. This phenomenon is created by printing cylinder vibration, for instance. The vibration may in turn be caused by the image to be printed, namely by the arrangement of printing and non-printing areas on the flexographic printing formes.

An unsatisfactory prior art way of avoiding the bouncing effect is to modify the image to be printed by additional printing or non-printing areas, which are actually not part of the desired image. Another prior art way that is likewise unsatisfactory because it creates too many unusable prints is to reduce the printing speed because the bouncing phenomenon only occurs at specific printing speeds due to resonance. Such modifications are usually made by an operator of the press.

Another option is to provide acceleration sensors that measure the vibration to initiate a printing speed change in an automated way. That option is expensive and therefore likewise unsatisfactory. German published patent application DE 10 2005 012 915 A1 discloses a method for operating a rotary printing press with rotating components in a way that vibration that creates undesired stripes on the web is to be avoided. The document proposes to provide a sensor on the journal of the rotating component to detect the vibration. German published patent application DE 10107135 A1 discloses a web-fed printing press such as a flexographic printing press and a method for damping vibrations. The document proposes to provide a detection device in the form of a sensor on a bearing block for a printing cylinder.

BRIEF SUMMARY OF THE INVENTION

It is accordingly an object of the invention to provide a method of operating a printing press which overcomes the above-mentioned disadvantages of the heretofore-known devices and methods of this general type and which provides for a method that provides printing at low cost without disturbance.

With the above and other objects in view there is provided, in accordance with the invention, a method of operating a rotary printing press, the method comprising:

during an operation of the printing press, detecting disturbances of a rotating printing cylinder by monitoring an actuating drive of the printing cylinder; and when disturbances at the printing cylinder are detected via the actuating drive of the printing cylinder, changing a printing speed of the rotary printing press in order to reduce or eliminate the disturbances.

In other words, the method of the invention for operating a rotary printing press comprises the steps of detecting disturbances of a rotating printing cylinder and modifying the printing speed to reduce the disturbances. According to the invention, the disturbances are detected on an actuating drive of the printing cylinder.

The invention advantageously provides a way to achieve low-cost printing without disturbances. In accordance with the invention, disturbances are not detected at a purely mechanical component such as the printing cylinder journal or bearing block thereof, but at an actuating drive of the printing cylinder, preferably at an electrical actuating drive. Thus no additional expensive sensors at purely mechanical components are necessary. The actuating drive may advantageously be used as a sensor or to detect disturbances. It is advantageously possible to use an electric component of the actuating drive, preferably a transducer of the actuating drive, for this purpose. No additional sensors need to be installed, a fact which reduces the corresponding costs.

In accordance with a further development of the invention, the disturbances are detected directly at the actuating drive of the printing cylinder, for instance collected at the latter or at the lines or contacts thereof.

One further development may be characterized in that the actuating drive is provided as a rotary drive with an electric motor.

One further development may be characterized in that the actuating drive is provided as a rotary drive with a servomotor.

One further development may be characterized in that the disturbances are detected at the servomotor.

In accordance with a further development of the invention, the disturbances are detected at a transducer (encoder) of the servomotor, for instance picked up at the latter or at the lines or contacts thereof. The transducer may be used to control the motor (potentially in a closed control loop).

In a further development of the invention, the transducer is provided as a rotary encoder.

A further development may be characterized in that the transducer is provided as a rotary angle encoder.

A further development may be characterized in that the transducer is provided as an incremental encoder.

A further development may be characterized in that the transducer is provided as a current transducer (current encoder).

A further development may be characterized in that the transducer is provided as an encoder that provides output signals.

A further development may be characterized in that the disturbances are detected by way of the current consumption of the servomotor, in particular by way of the current consumption changes.

In a further development of the invention, the output signals of the encoder and/or the current consumption changes are checked for vibration.

In a further development, the check comprises a comparison between an amplitude of the vibration and a predefined maximum amplitude.

One further development may be characterized in that the check is done computationally using a digital computer. The digital computer may be connected to the transducer by wires or in a wireless way, for instance by one or more signal lines or one or more data lines.

One further development may be characterized in that the actuating drive is provided as an actuating drive of a device for controlling the position of the printing cylinder.

One further development may be characterized in that the actuating drive is provided as an actuating drive of a device for controlling the contact pressure between the printing cylinder and the impression cylinder.

One further development may be characterized in that the device for position control is activated during the detection of the disturbances.

One further development may be characterized in that at least during the detection of the disturbances, the actuating drive is not braked, for instance due to the fact that a holding brake on the actuating drive is in a released state.

One further development may be characterized in that the device for position control is provided including a spindle for a rectilinear adjustment of the position of the printing cylinder, in particular for an adjustment of the position relative to an associated impression cylinder.

One further development may be characterized in that the device for position control is provided comprising a ball screw spindle.

One further development may be characterized in that the device for position control is provided on a drive side of the rotary printing press.

One further development may be characterized in that the device for position control is provided on an operator side of the rotary printing press.

One further development may be characterized in that a respective device for position control is provided on a drive side and on an operator side of the rotary printing press. In such a case, a detection of the disturbances may take place on one side (on one actuating drive) or on both sides (on a total of two actuating drives).

One further development may be characterized in that the printing speed is changed, preferably by changing the rotary speed of the printing cylinder.

One further development may be characterized in that the speed of web transport is changed, preferably by changing the rotary speed of the printing cylinder or by changing the rotary speed of pull rollers pulling the web.

One further development may be characterized in that further disturbances occurring on at least one further rotating printing cylinder as a function of the printing speed of the rotary printing press are detected at an actuating drive of the further printing cylinder and the disturbances and the further disturbances are reduced by changing the printing speed of the rotary printing press.

One further development may be characterized in that both disturbances are jointly reduced.

One further development may be characterized in that the printing speed of the rotary printing press is decreased or increased until both disturbances are reduced to below a predefined maximum disturbance threshold.

One further development may be characterized in that the decrease or increase in the printing speed of the rotary printing machine is done in increments.

One further development may be characterized in that the printing cylinders are provided as flexographic printing cylinders.

One further development may be characterized in that each printing cylinder (of a given number of printing cylinder) is engagement with a respective screen roller (of an identical number of screen rollers).

One further development may be characterized in that the printing cylinders are provided in a respective flexographic printing unit.

One further development may be characterized in that the flexographic printing units are provided in a flexographic printing press that processes webs.

One further development may be characterized in that the disturbances are a function of the mechanical natural frequency of the rotary printing press or the printing units thereof or the printing cylinders thereof.

One further development may be characterized in that the disturbances are a function of the printing speed of the rotary printing machine.

One further development may be characterized in that the disturbances are a function of the image on a printing forme received on the printing cylinder.

One further development may be characterized in that the disturbances cause printing cylinder vibration.

A combination of the features of the invention, the further developments of the invention, and the exemplary embodiments of the invention likewise creates advantageous further developments of the invention. In addition, further developments of the invention may include the individual features or combinations of features disclosed in the above introductory text.

Other features which are considered as characteristic for the invention are set forth in the appended claims.

Although the invention is illustrated and described herein as embodied in method for operating a rotary printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
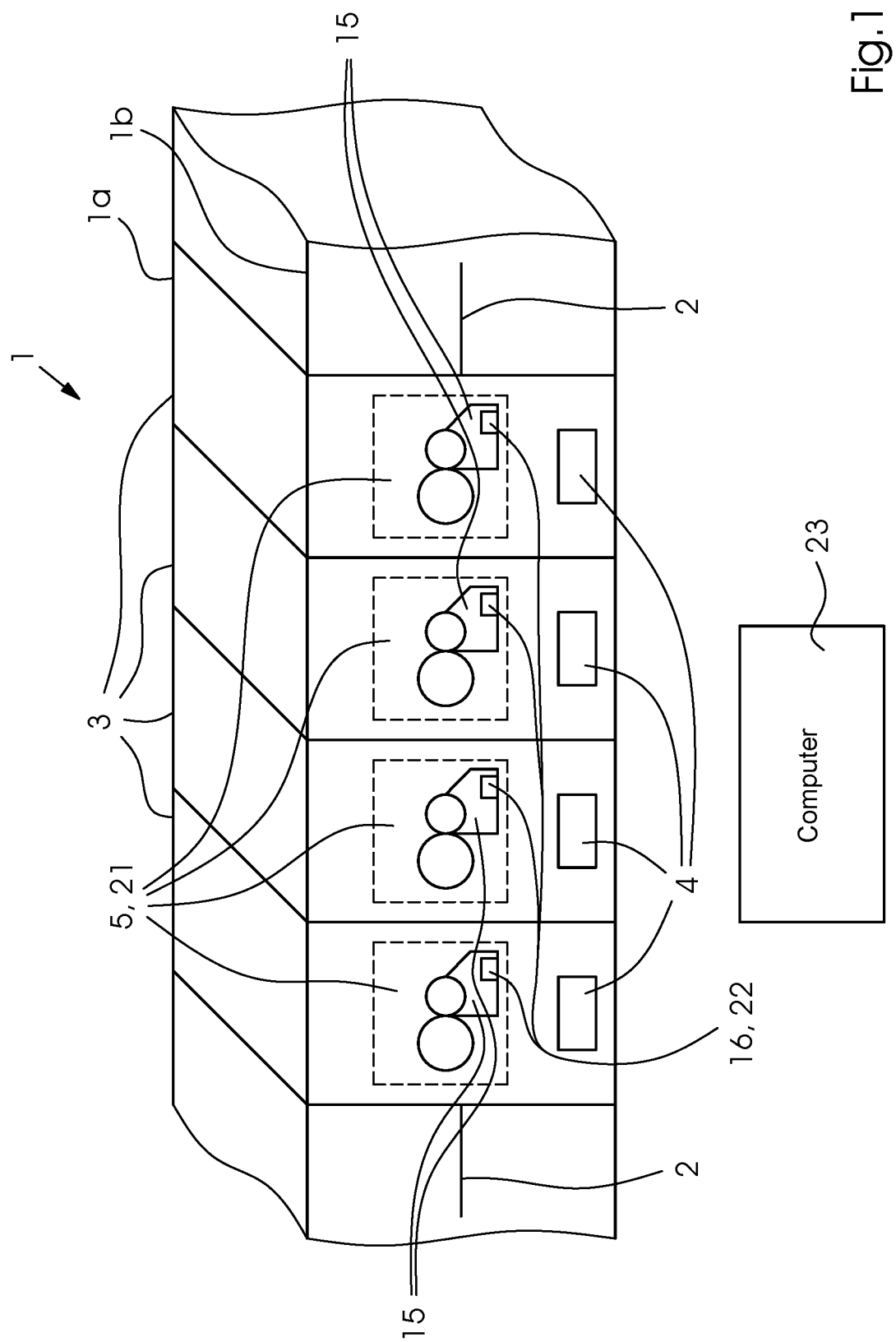
FIG. 1 is a diagrammatic illustration of a machine for implementing the method according to the invention.

Referring now to the figures of the drawing in detail and first, in particular, to FIG. 1 thereof, there is shown an exemplary web-fed flexographic printing machine 1 implementing a preferred embodiment of the method according to the invention.

The machine 1 has an in-line configuration with two longitudinal sides: a drive side 1a and an opposite operator side 1b. The machine processes, or rather prints on, a web of printing substrate 2. In preferred embodiments, the web 2 is made of paper, cardboard, paperboard, foil, or a composite material. The web may be supplied by means of a device for unwinding a web. The machine comprises a number of printing units 3 preferably arranged to succeed one another in a processing direction. Every printing unit has at least one motor 4 for driving the printing unit or at least one cylinder of the printing unit during the printing operation. Having been printed on, the web may be subjected to further processing such as die-cutting or punching.

Figure 3:
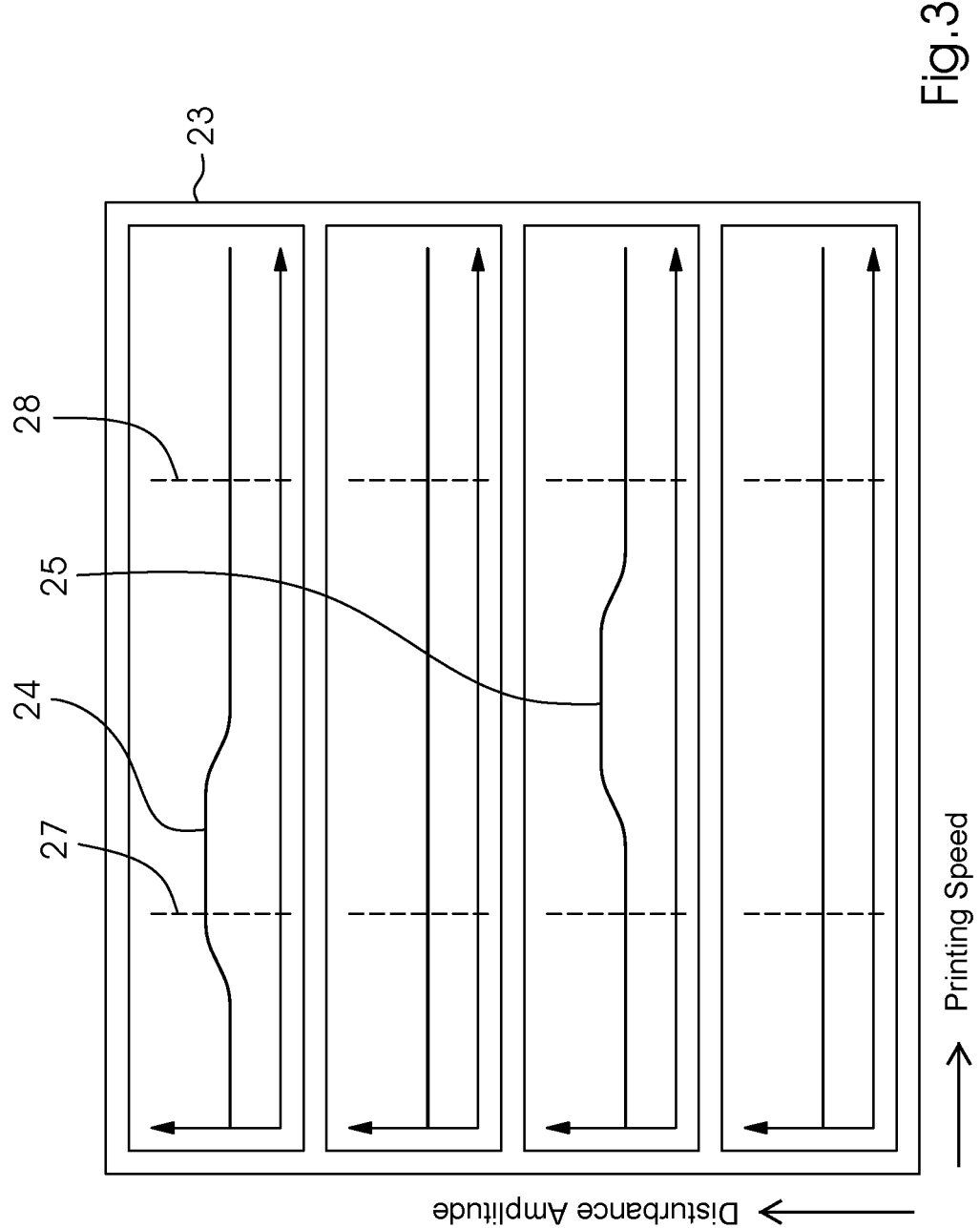
FIG. 3 is a chart illustrating the method according to the invention.

The machine 1 comprises a number of printing cylinders 5 and 21, in particular flexographic printing cylinders, and associated impression cylinders 6 and screen rollers 7 (cf. FIG. 3). A printing forme 8 (also known as a stereotype), in particular a flexographic printing plate with raised printing areas, bearing an image 9 to be printed that consists of printing and non-printing areas is received on each printing cylinder.

At least one or two printing units, and preferably all of the printing units 3, preferably comprise a control device 15 including a respective actuating drive 16 or 22.

The machine 1 further includes a digital computer 23. Connections for exchanging signals or data with the machine and the components thereof such as the motors 4 or actuating drives 16 are provided even though they are not shown for reasons of clarity.

Figure 2:
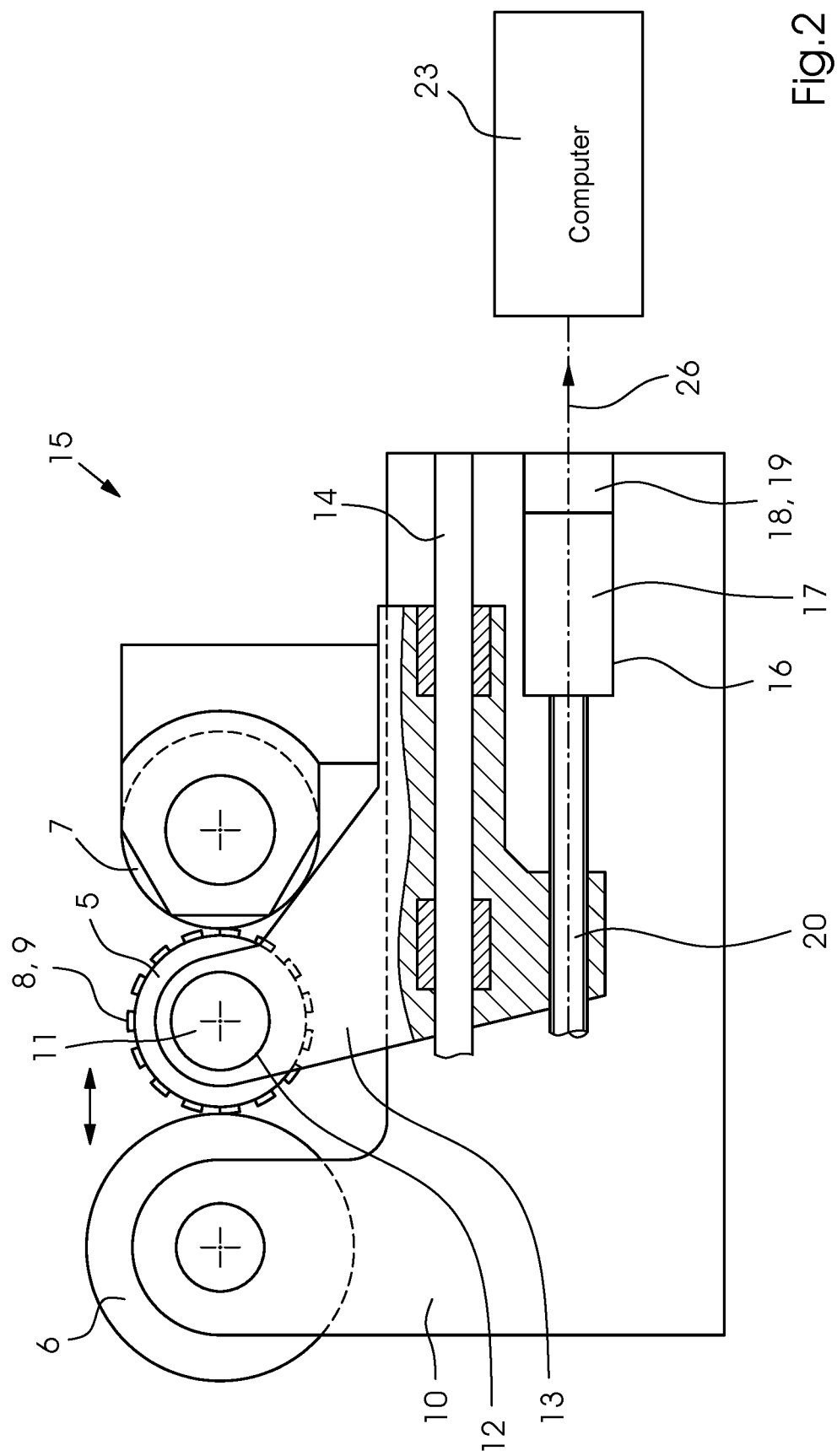
FIG. 2 is a diagrammatic side view of a machine for implementing a method of the invention.

FIG. 2 illustrates a control device 15, or closed-loop controller 15, as it implements a preferred embodiment of the method of the invention.

On at least one side (the drive side 1a or the operator side 1b), the impression cylinder 6 is received in a frame 10 of the machine 1. The journal 11 of the printing cylinder 5 is received in a bearing 12 of a bearing block 13. The bearing block is movable relative to the frame, preferably in a horizontal direction. A guide 14 is provided for this purpose.

A control device 15 is provided on the drive side and/or on the operator side, preferably for controlling the position of the printing cylinder 5 and/or for controlling the contact pressure between the printing cylinder 5 and the impression cylinder 6. The device includes an actuating drive 16, preferably an electric motor 17, especially a servomotor 17 including a transducer 18. The transducer 18 may be an encoder 19 or may include an encoder 19. A spindle 20, preferably a ball screw spindle, is coupled or fixed to the actuating drive 16. In interaction with the guide 14, the spindle 20 converts the rotary movement of the actuating drive into a linear movement of the bearing block 13.

The digital computer 23 is connected to the actuating drive 16, in particular with its transducer 18 and/or encoder 19. The digital computer may control the rotary movement of the actuating drive, thus controlling the position and/or contact pressure between the printing cylinder 5 and the impression cylinder 6.

As the printing cylinder 5 rotates, raised portions of the stereotype 8 may lead to printing cylinder disturbances, in particular vibration (also known as bouncing), which may in turn cause defects in the printed image. Such disturbances may be detected at the actuating drive 16, the electric motor 17, or the transducer 18, because the disturbances/vibrations are transmitted to or fed back to the actuating drive and the components thereof via the bearing block 13 and the spindle 20. Corresponding (current or voltage) signals or data may be picked up at the transducer and forwarded to the digital computer 23. They may then be analyzed by the digital computer. In this process, the disturbances may be computationally detected and measures to reduce them may be taken. The digital computer may actuate the motor 4 of the associated printing unit 3 or all motors 4 of all printing units in such a way that the disturbances/vibrations are reduced or compensated for. In particular, the printing speed may be modified, e.g. increased or decreased.

FIG. 3 illustrates selected steps of a preferred embodiment of the method of the invention.

The Figure schematically shows the digital computer 23 that monitors the four printing unit shown by way of example and computationally evaluates or analyzes the disturbance to compensate for them, reduce them, or prevent them in the process. A diagram plotting the amplitude of a disturbance over the printing speed is shown for every printing unit (first to fourth printing unit, from top to bottom).

In the illustrated example, a printing-speed-related disturbance 24 occurs in a first printing unit and a further disturbance 25 occurs in a further printing unit, for instance a third printing unit. The digital computer 23 detects these disturbances at the respective printing speeds. The disturbances may be detected by means of a comparison between the amplitude and a predefined threshold. For instance, when a disturbance is detected at a first printing speed 27, the printing speed may be modified until, at a second printing speed, no more disturbances occur—neither in the first printing unit nor in any other one. This second printing speed is the one that is subsequently used to operate the machine 1. In other words, the printing speed is increased (or decreased), for instance, until no disturbances occur in any one of the printing units.

The following is a summary list of reference numerals and the corresponding structure used in the above description of the invention:

1 rotary printing machine
1a drive side
1b operator side
2 web of printing material
3 printing units
4 motors
5 printing cylinder
6 impression cylinder
7 screen roller
8 printing forme/stereotype
9 print image
10 frame
11 cylinder journal
12 bearing
13 bearing block
14 guide
15 control device
16 actuating drive
17 electric motor or servomotor
18 transducer
19 encoder
20 spindle
21 further printing cylinders
22 actuating drive
23 digital computer
24 disturbances
25 further disturbances
26 output signals
27 first printing speed
28 second printing speed

The invention claimed is:
1. A method of operating a rotary printing press, the method comprising:

providing a rotating printing cylinder with an actuating drive, the actuating drive comprising a spindle and a servomotor with a transducer;

providing an impression cylinder associated with the rotating printing cylinder;

adjusting, via the spindle, the position of the rotating printing cylinder relative to the impression cylinder and thereby controlling a contact pressure between the rotating printing cylinder and the impression cylinder;

during an operation of the printing press, detecting disturbances of the rotating printing cylinder by monitoring the transducer of the actuating drive of the printing cylinder;

when disturbances at the rotating printing cylinder are detected via the transducer of the actuating drive of the printing cylinder, changing a printing speed of the rotary printing press in order to reduce or eliminate the disturbances.

2. The method according to claim 1, which comprises, when disturbances at the printing cylinder are detected via the actuating drive, reducing the printing speed of the rotary printing press.

3. The method according to claim 1, wherein the transducer is an encoder providing output signals.

4. The method according to claim 3, which comprises examining the output signals of the encoder for vibration.

5. The method according to claim 1, wherein the actuating drive controls a position of the printing cylinder.

6. The method according to claim 1, which comprises detecting further disturbances that are dependent on the printing speed of the rotary printing machine at an actuating drive of at least one further rotating cylinder and reducing the disturbances and the further disturbances by changing the printing speed of the rotary printing machine.

7. The method according to claim 6, which comprises decreasing or increasing the printing speed of the rotary printing machine until the disturbance and the further disturbance are reduced to below a predefined maximum disturbance threshold.

8. The method according to claim 1, wherein the disturbances are dependent on a print image on a printing forme at the printing cylinder.

* * * * *